(12) United States Patent
Peng et al.

(10) Patent No.: US 10,526,089 B2
(45) Date of Patent: Jan. 7, 2020

(54) AIRCRAFT SPRAYING CONTROL DEVICE, METHOD THEREOF, AND SPRAYING SYSTEM

(71) Applicant: GUANGZHOU XAIRCRAFT TECHNOLOGY CO., LTD., Gaungzhou (CN)

(72) Inventors: Bin Peng, Guangzhou (CN); Dengfeng Li, Guangzhou (CN)

(73) Assignee: GUANGZHOU XAIRCRAFT TECHNOLOGY CO., LTD., Guangzhou (CN)

( * ) Notice: Subject to any disclaimer, the term of this patent is extended or adjusted under 35 U.S.C. 154(b) by 186 days.

(21) Appl. No.: 15/561,292

(22) PCT Filed: Feb. 20, 2017

(86) PCT No.: PCT/CN2017/074162
§ 371 (c)(1),
(2) Date: Sep. 25, 2017

(87) PCT Pub. No.: WO2017/143959
PCT Pub. Date: Aug. 31, 2017

(65) Prior Publication Data
US 2018/0099747 A1    Apr. 12, 2018

(30) Foreign Application Priority Data
Feb. 22, 2016   (CN) .......................... 2016 1 0096245

(51) Int. Cl.
*H02P 5/00*         (2016.01)
*B64D 1/18*         (2006.01)
(Continued)

(52) U.S. Cl.
CPC ............ *B64D 1/18* (2013.01); *A01M 7/0089* (2013.01); *B05B 12/08* (2013.01); *B05B 12/126* (2013.01)

(58) Field of Classification Search
CPC ..... B05B 12/126; B05B 13/005; B05B 12/08; B64D 1/18
(Continued)

(56) References Cited

U.S. PATENT DOCUMENTS 5,992,686 A    11/1999  Cline et al.
6,578,669 B2 *  6/2003  Kast .......................... B61K 3/02
                                                        184/3.2
(Continued)

FOREIGN PATENT DOCUMENTS

CN        204279954 U     4/2015
CN        105197243 A    12/2015
(Continued)

*Primary Examiner* — Bickey Dhakal
*Assistant Examiner* — Gabriel Agared
(74) *Attorney, Agent, or Firm* — Wiggin and Dana LLP; Joseph Casino; Jonathan D. Hall (57) ABSTRACT

The embodiments of the disclosure discloses an aircraft spraying control device, a method thereof, and a spraying system, relating to the technical field of agricultural plant protection. The aircraft spraying control device comprises a micro-controller, a pump motor, and a nozzle motor; the micro-controller acquires the flight information of the aircraft and the preset pesticide spraying information of the aircraft, and acquires the target rotational speed n of the pump motor according to the flight information of the aircraft, the preset pesticide spraying information of the aircraft, and the pesticide discharging amount K per rotation of the pump motor so as to control the pump motor to rotate at the target rotational speed n of the pump motor so that the pump supplies pesticide to a nozzle. The micro-controller also controls the nozzle to spray.

11 Claims, 5 Drawing Sheets

(51) Int. Cl.
*B05B 12/12* (2006.01)
*A01M 7/00* (2006.01)
*B05B 12/08* (2006.01)

(58) Field of Classification Search
USPC .......................................................... 318/34
See application file for complete search history.

(56) References Cited

U.S. PATENT DOCUMENTS

| | | | | |
|---|---|---|---|---|
| 2005/0189036 | A1* | 9/2005 | Bryan | B64F 1/28 |
| | | | | 141/94 |
| 2015/0272106 | A1* | 10/2015 | Schertz | A01M 7/0089 |
| | | | | 239/11 |
| 2015/0367357 | A1* | 12/2015 | Humpal | B05B 1/30 |
| | | | | 239/1 |
| 2015/0375247 | A1* | 12/2015 | Funseth | B05B 12/04 |
| | | | | 239/68 |

FOREIGN PATENT DOCUMENTS

| | | |
|---|---|---|
| CN | 105292480 A | 2/2016 |
| DE | 298623 A | 3/1992 |
| DE | 298623 A5 | 3/1992 |
| JP | H10113589 A | 5/1998 |
| JP | 2004322836 A | 11/2004 |
| JP | 2009265230 A | 11/2009 |
| JP | 2012126216 A | 7/2012 |

\* cited by examiner

Fig. 1

S11 — The micro-controller acquires the flight information of the aircraft and the preset pesticide spraying information of the aircraft S12 — the micro-controller acquires the target pesticide spraying amount Q of each nozzle per unit time according to the flight information of the aircraft and the preset pesticide spraying information of the aircraft S13 — the micro-controller reads the pesticide discharging amount K per rotation of the pump motor, acquires the target rotational speed n of the pump motor according to the target pesticide spraying amount Q of each nozzle per unit time and the pesticide discharging amount K per rotation of the pump motor, and controls the pump motor drive module to drive the pump motor to rotate at the target rotational speed n of the pump motor; and controls the nozzle to spray, so that the pump motor 20 controls the pump to supply pesticide to the corresponding nozzle and so that the nozzle sprays

```
┌─────────────────────────────────────────────────────────────┐
│ acquiring the spraying area S per unit time according to the flight │─── S501
│ velocity V of the aircraft and the preset spraying width H of the   │
│                          aircraft                                    │
└─────────────────────────────────────────────────────────────┘
                               │
                               ▼
┌─────────────────────────────────────────────────────────────┐
│ acquiring the total spraying amount Q' per unit time according to   │─── S502
│ the spraying area S per unit time and the preset pesticide receiving│
│              amount M per unit area of crop                          │
└─────────────────────────────────────────────────────────────┘
                               │
                               ▼
┌─────────────────────────────────────────────────────────────┐
│  acquiring the target pesticide spraying amount Q of each nozzle    │
│ per unit time according to the total spraying amount Q' per unit time│─── S503
│                   and the number m of nozzles                        │
└─────────────────────────────────────────────────────────────┘
```

Fig. 9

AIRCRAFT SPRAYING CONTROL DEVICE, METHOD THEREOF, AND SPRAYING SYSTEM

FIELD

The disclosure relates to the technical field of agricultural plant protection, and in particular to an aircraft spraying control device, a method thereof, and a spraying system.

BACKGROUND

It is difficult to keep the flight speed of the aircraft constant because the spraying system in the aircraft is operating in flight and the aircraft is liable to be disturbed by the external environment in flight. In the process of spraying pesticide, the aircraft should achieve the rated flight speed and must go through an acceleration phase, and in the process of spraying to the end of farmland or completing spraying, the aircraft must also go through a deceleration phase. Therefore, when the pump motor and/or the nozzle motor keep the rotational speed constant, if the above situation occurs, there will be a problem that pesticide is sprayed unevenly when the aircraft sprays pesticide.

SUMMARY

It is an object of the disclosure to provide an aircraft spraying control device, a method thereof, and a spraying system to reduce the influence of flight factors on the pesticide spraying uniformity when a pump motor and a nozzle motor keep the target rotational speed unchanged.

In order to achieve the above object, the embodiments of the disclosure provide the following technical solutions:

A first aspect of the embodiments of the disclosure provides an aircraft spraying control device, including a micro-controller and a pump motor drive module;

the micro-controller is configured to acquire the flight information of the aircraft and the preset pesticide spraying information of the aircraft, and acquire the target pesticide spraying amount Q of each nozzle per unit time; is configured to read the pesticide discharging amount K per rotation of the pump motor, acquire the target rotational speed n of the pump motor according to the target pesticide spraying amount Q of each nozzle per unit time and the pesticide discharging amount K per rotation of the pump motor, and control the pump motor drive module to drive the pump motor to rotate at the target rotational speed n of the pump motor; and is configured to control the nozzle to spray; and the pump motor drive module is configured to drive the pump motor to rotate at the target rotational speed n of the pump motor so that the pump motor controls the pump to supply pesticide to the corresponding nozzle.

According to the first aspect of the embodiments of the disclosure, a second aspect of the embodiments of the disclosure provides an aircraft spraying control method applied to the aircraft spraying control device according to the first aspect of the embodiments of the disclosure, including:

acquiring the flight information of the aircraft and the preset pesticide spraying information of the aircraft;

acquiring the target pesticide spraying amount Q of each nozzle per unit time according to the flight information of the aircraft and the preset pesticide spraying information of the aircraft; and reading the pesticide discharging amount K per rotation of the pump motor, acquire the target rotational speed n of the pump motor according to the target pesticide spraying amount Q of each nozzle per unit time and the pesticide discharging amount K per rotation of the pump motor, and control the pump motor drive module to drive the pump motor to rotate at the target rotational speed n of the pump motor, and control the spraying of the nozzle so that the pump motor controls the pump to supply pesticide to the corresponding nozzle and the nozzle sprays.

According to the first aspect of the embodiments of the disclosure, a third aspect of the embodiments of the disclosure provides an aircraft spraying system, including the aircraft spraying control device according to the first aspect of the embodiments of the disclosure, and further including a flight controller configured to transmit the flight information of the aircraft and the preset pesticide spraying information of the aircraft to the micro-controller.

The aircraft spraying control device provided by the embodiments of the disclosure may have the following beneficial effects:

In the aircraft spraying control device provided by the embodiments of the disclosure, the rotational speed of the pump motor is the target rotational speed n of the pump motor, and the target rotational speed n of the pump motor is acquired according to the target pesticide spraying amount Q of each nozzle per unit time and the pesticide discharging amount K per rotation of the pump motor after the micro-controller acquires the target pesticide spraying amount Q of each nozzle per unit time according to the flight information of the aircraft and the preset pesticide spraying information of the aircraft. Therefore, the target rotational speed n of the pump motor takes into account the flight information of the aircraft, adjusts the target rotational speed n of the pump motor in real time so as to drive the pump motor through the pump motor drive module to rotate at the target rotational speed n of the pump motor, and thereby adjusts the pesticide supplying amount from the pump in which the pump motor is located to the corresponding nozzle. In this way, the influence of flight factors on the pesticide spraying uniformity can be reduced.

BRIEF DESCRIPTION OF THE DRAWINGS

The drawings described herein are intended to provide a further understanding of the disclosure and form a part of the disclosure. The illustrative embodiments of the disclosure and a description thereof are illustrative of the disclosure and are not to be construed as limiting the disclosure. In the drawings.

REFERENCE NUMERALS

1—a micro-controller; 2—a pump motor drive module; 20—a pump motor; 3—a nozzle motor drive module; 30—a nozzle motor; 4—a flight controller; 5—a first control module; 6—a first rotational speed detection module; 7—a second control module; 8—a second rotational speed detection module.

DETAILED DESCRIPTION OF THE EMBODIMENTS

In order to further explain the aircraft spraying control device, the method thereof, and the spraying system provided by the embodiments of the disclosure, the details will be described below with reference to the drawings.

Figure 1:
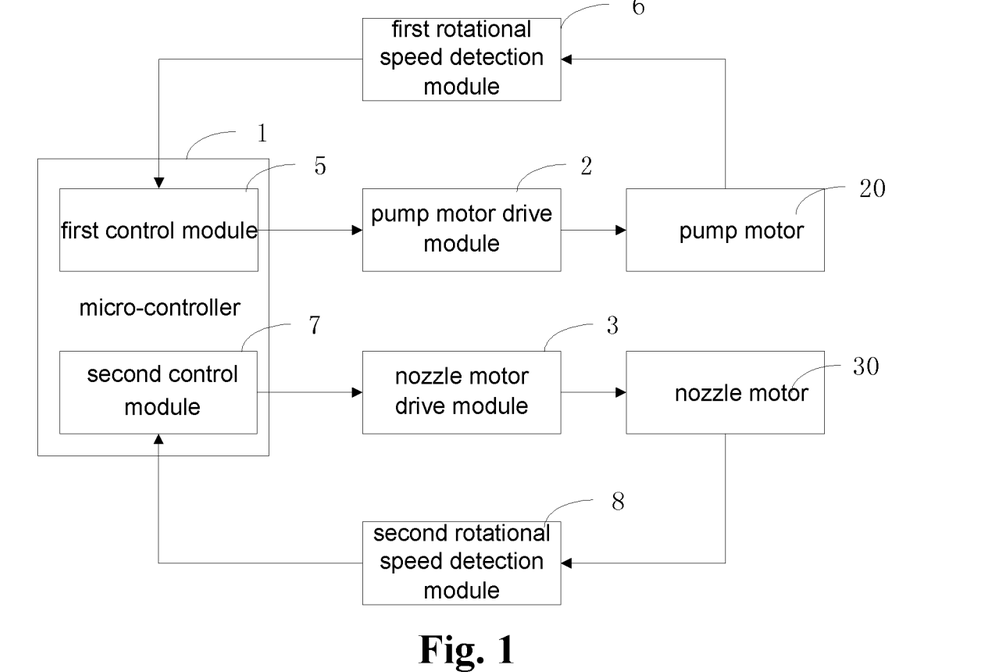
FIG. 1 is a structural block diagram of the aircraft spraying control device provided according to an embodiment of the disclosure.
Figure 2:
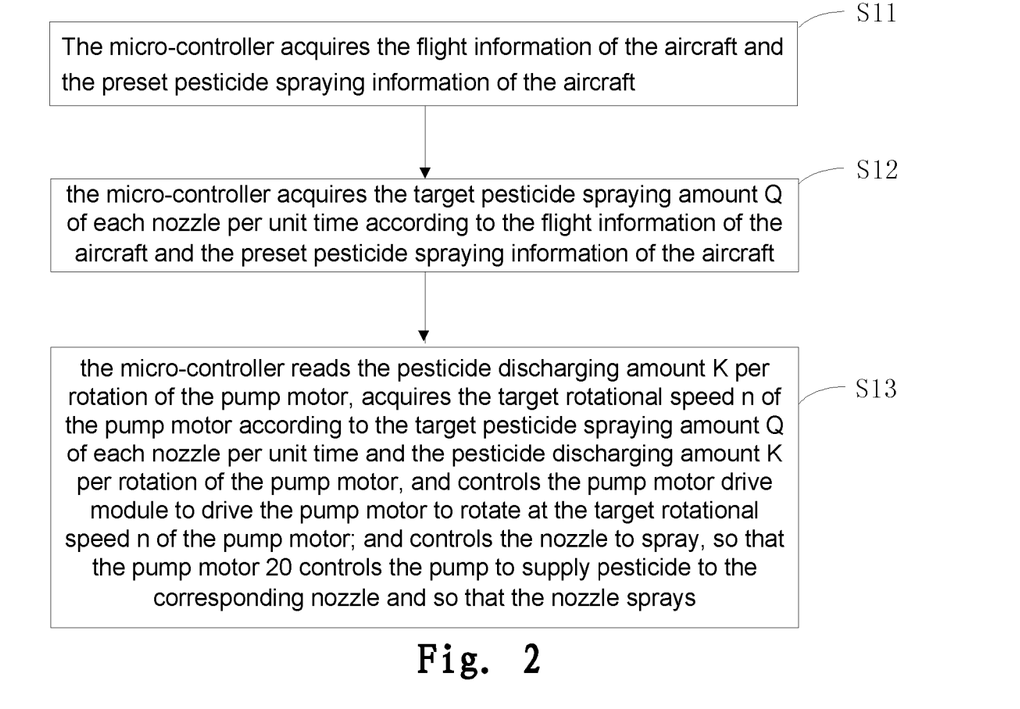
FIG. 2 is a flow diagram of the adjustment of the rotational speed of the pump of the aircraft spraying control device provided according to an embodiment of the disclosure.

Referring to FIGS. 1 and 2, the embodiments of the disclosure provide an aircraft spraying control device, including a micro-controller 1 and a pump motor drive module 2, wherein the output of the micro-controller 1 is connected with the input of the pump motor drive module 2; wherein, the micro-controller 1 is configured to acquire the flight information of the aircraft and the preset pesticide spraying information of the aircraft, and acquire the target pesticide spraying amount Q of each nozzle per unit time according to the flight information of the aircraft and the preset pesticide spraying information of the aircraft; is configured to read the pesticide discharging amount K per rotation of the pump motor, acquire the target rotational speed n of the pump motor according to the target pesticide spraying amount Q of each nozzle per unit time and the pesticide discharging amount K per rotation of the pump motor, and control the pump motor drive module to drive the pump motor to rotate at the target rotational speed n of the pump motor; and is configured to control the nozzle to spray; so that the pump motor 20 controls the pump to supply pesticide to the corresponding nozzle and so that the nozzle sprays. It should be noted that the spraying referred to in the embodiment of the disclosure is to spray the pesticide supplied from the pump to the object to be sprayed, and the object to be sprayed may be crop or the like.

The pump motor drive module 2 is configured to drive the pump motor 20 to rotate at the target rotational speed n of the pump motor so that the pump motor 20 controls the pump to supply pesticide to the corresponding nozzle.

The nozzle may be a high-pressure atomizing nozzle or a centrifugal atomizing nozzle. In the embodiment of the disclosure, the nozzle is optionally a centrifugal atomizing nozzle which includes a nozzle motor configured to drive the spray plate in the nozzle to rotate at a high speed so that the liquid is rotated at a high speed, so that the liquid collides with each other and is centrifuged to form a droplet of very small diameter.

An optional implementation process of the aircraft spraying control device provided according to the embodiments will be described with reference to FIGS. 1 and 2:

S11: the micro-controller 1 acquires the flight information of the aircraft and the preset pesticide spraying information of the aircraft;

S12: the micro-controller 1 acquires the target pesticide spraying amount Q of each nozzle per unit time according to the flight information of the aircraft and the preset pesticide spraying information of the aircraft; and S13: the micro-controller 1 reads the pesticide discharging amount K per rotation of the pump motor, acquires the target rotational speed n of the pump motor according to the target pesticide spraying amount Q of each nozzle per unit time and the pesticide discharging amount K per rotation of the pump motor, and controls the pump motor drive module 2 to drive the pump motor 20 to rotate at the target rotational speed n of the pump motor; and controls the nozzle to spray; so that the pump motor 20 controls the pump to supply pesticide to the corresponding nozzle and so that the nozzle sprays.

It can be seen from the optional implementation process of the aircraft spraying control device provided according to the above embodiments that the rotational speed of the pump motor 2 is the target rotational speed n of the pump motor, and the target rotational speed n of the pump motor is acquired according to the target pesticide spraying amount Q of each nozzle per unit time and the pesticide discharging amount K per rotation of the pump motor after the micro-controller 1 acquires the target pesticide spraying amount Q of each nozzle per unit time according to the flight information of the aircraft and the preset pesticide spraying information of the aircraft. Therefore, the target rotational speed n of the pump motor takes into account the flight information of the aircraft, adjusts the target rotational speed n of the pump motor in real time so as to drive the pump motor 20 through the pump motor drive module 2 to rotate at the target rotational speed n of the pump motor, and thereby adjusts the pesticide supplying amount from the pump 20 in which the pump motor is located to the corresponding nozzle 30. In this way, the influence of flight factors on the pesticide spraying uniformity can be reduced.

It should be noted that the pump motor 20 in the above embodiment as a part of a pump is capable of supplying power to the pump so as to draw pesticide from the pesticide kit to supply the pesticide to the nozzle; and the nozzle atomizes the pesticide into very fine droplet particles.

In addition, the number of the pump motor drive modules 2 in the above embodiments may be limited according to the number of pumps. It could be one pump motor drive module 2 correspondingly controls one pump motor 2 to rotate so that the pump transports the pesticide to one nozzle. In addition, the number of the pump motor drive module 2 in the above embodiments may be one, and the pump motor drive module 2 may be connected with a plurality of pump motors, respectively, so that the pump motor drive module 2 can control the plurality of pump motors 20 to rotate at the same time.

There are many implementing ways in which the micro-controller 1 in the above embodiments is configured to acquire the target pesticide spraying amount Q of each nozzle per unit time according to the flight information of the aircraft and the preset pesticide spraying information of the aircraft. For example, the flight information of the aircraft is configured to include a flight velocity V of the aircraft, and the preset pesticide spraying information is configured to include the preset pesticide receiving amount M per unit area of crop and the preset spraying width H of the aircraft; the micro-controller 1 calculates the acquired target pesticide spraying amount Q of each nozzle per unit time using the flight information according to a preset algorithm; the preset algorithm is $$Q = \frac{VMH}{m};$$

where m is the number of nozzles.

Optionally, acquiring the target pesticide spraying amount Q of each nozzle per unit time can be divided into the following three steps:

Step 1: the micro-controller 1 acquires the spraying area S per unit time according to the flight velocity V of the aircraft and the preset spraying width H of the aircraft in which S=VH;

Step 2: the micro-controller 1 acquires the total spraying amount Q' per unit time according to the spraying area S per unit time and the preset pesticide receiving amount M per unit area of crop in which Q'=MS=VHM; and Step 3: the micro-controller 1 acquires the target pesticide spraying amount $$Q = \frac{VMH}{m}$$

of each nozzle per unit time according to the total spraying amount Q' per unit time and the number m of nozzles.

However, the micro-controller 1 in the above embodiments is configured to acquire the target rotational speed $$n = \frac{Q}{K}$$

of the pump motor according to the target pesticide spraying amount Q of each nozzle per unit time and the pesticide discharging amount K per rotation of the pump motor.

It should be noted that the flight velocity V of the aircraft and the preset pesticide receiving amount M per unit area of crop in the above embodiments may be transmitted to the micro-controller 1 by other devices on an unmanned aerial vehicle, such as a flight controller (hereinafter referred to as flight controller), and the preset spraying width H of the aircraft is generally a set value which is input by a client, or the preset spraying width H of the aircraft is transmitted to the micro-controller 1 by other devices on an unmanned aerial vehicle, such as a flight controller. In addition, the pesticide discharging amount K per rotation in the above embodiments is set according to the parameters of the pump motor.

It should be noted that there are many unstable factors in the rotation of the pump motor 20 so that the rotational speed of the pump motor 20 is liable to fluctuate during the rotation. Therefore, although the micro-controller 1 transmits the target rotational speed n of the pump motor to the pump motor drive module 2 so that the pump motor drive module 2 drives the pump motor 20 to rotate at the target rotational speed n of the pump motor, if an unstable factor affecting the rotational speed of the pump motor 20 occurs during the rotation of the pump motor 20, the actual rotational speed thereof may be deviated from the target rotational speed.

In order to keep the pump motor 20 rotating according to the target rotational speed n of the pump motor, continuing to refer to FIG. 1, the aircraft spraying control device provided by the above embodiments further includes a first rotational speed detection module 6, the micro-controller 1 is provided with a first control module 5, the input of the first rotational speed detection module 6 is connected with the pump motor 20 and the output thereof is connected with the input of the first control module 5; the output of the first control module 5 is connected with the input of the pump motor drive module 2; and the first control module 5 is configured to control the pump motor drive module 2 to drive the pump motor 20 to rotate at the target rotational speed n of the pump motor according to the target rotational speed n of the pump motor and the rotational speed information of the pump motor collected by the first rotational speed detection module 6.

In an embodiment, the rotational speed information of the pump motor collected by the first rotational speed detection module 6 includes a current rotational speed $n_i$ of the pump motor and a rotational speed $n_{i-1}$ of the pump motor at a previous time; the first control module 5 is configured to acquire a duty ratio of a first control pulse according to the target rotational speed n of the pump motor, the current rotational speed $n_i$ of the pump motor, and the rotational speed $n_{i-1}$ of the pump motor at a previous time, and transmit the first control pulse to the pump motor drive module 2 according to the duty ratio of the first control pulse to control the pump motor drive module 2 to drive the pump motor 20 according to the first control pulse to rotate at the target rotational speed n of the pump motor; wherein the duty ratio of the first control pulse is $=(n-n_i)K_p+(n-n_i)K_i+[(n-n_i)-(n_i-n_{i-1})]K_d$, wherein $K_p$ is the rotational speed ratio coefficient of the pump motor, $K_i$ is the rotational speed integral coefficient of the pump motor, and $K_d$ is the rotational speed differential coefficient of the pump motor.

It is possible to find that the first rotational speed detection module 6 can collect the rotational speed information of the pump motor in real time and transmit the rotational speed information to the first control module 5 with an example of controlling the pump motor drive module 20 by the first control module 5 to drive the pump motor 20 to rotate at the target rotational speed n of the pump motor. The first control module 5, the first rotational speed detection module 6, the pump motor drive module 2, and the pump motor 20 form a closed loop control, such that with such closed loop control, the first control module 5 can take the received rotational speed information of the pump motor and the target rotational speed n of the pump motor as parameters on the basis of monitoring the rotational speed information of the pump motor in real time, and acquire the duty ratio of the first control pulse using the duty ratio of the first control pulse=$(n-n_i)K_p+(n-n_i)K_i+[(n-n_i)-(n_i-n_{i-1})]K_d$, so that the pump motor drive module 2 drives the pump motor 20 according to the first control pulse corresponding to the duty ratio of the first control pulse to rotate at the target rotational speed n of the pump motor. In this way, even if some unstable factors affecting the rotational speed of the pump motor occur during the rotation of the pump motor 20, the pump motor drive module 2 can be controlled by the first control module 5 and the first rotational speed detection module 6 to drive the pump motor 20 to rotate at the target rotational speed n of the pump motor to ensure that the pump motor rotates at the target rotational speed n of the pump motor.

It should be noted that the example that the first control module 5 controls the pump motor drive module 2 to drive the pump motor 20 to rotate at the target rotational speed n of the pump motor is merely an example, but is not limited to this example.

Although the micro-controller 1 can control the nozzle to eject pesticide, since the optional nozzle in the embodiment of the disclosure is a centrifugal atomizing nozzle, the following scenarios may occur. In the case where the nozzle is a centrifugal atomizing nozzle, though the nozzle motor 30 can atomize pesticide at a constant rotational speed, since the target rotational speed n of the pump motor relates to the flight information of the aircraft and the preset pesticide spraying information of the aircraft in the process of acquiring, when the flight information of the aircraft is changed, it will cause the change of the target pesticide spraying amount Q of each nozzle per unit time, and then the target rotational speed n of the pump motor will change; and when the rotational speed of the pump motor changes, the pesticide flow ejected from the nozzle also has a corresponding change, and if the rotational speed of the nozzle motor of the nozzle is not adjusted accordingly, it may affect the atomization effect of the nozzle.

Referring again to FIG. 1, in order to solve this problem, the aircraft spraying control device provided by the above embodiments further includes a nozzle motor drive module 3; the micro-controller 1 is further configured to determine a rotational speed range in which the target rotational speed n of the pump motor is located, determine the target rotational speed n' of the nozzle motor according to the rotational speed range, and control the nozzle motor drive module to drive the nozzle motor to rotate at the target rotational speed n' of the nozzle motor.

First of all, by way of illustration, assuming that the rated maximum speed of the pump motor is 90 r/s or 90 rotation/second, the preset rotational speed range can be set to be three, namely, from 0 r/s to 30 r/s, from 31 r/s to 60 r/s, and from 61 r/s to 90 r/s, and each rotational speed range is corresponding to the target rotational speed n' of one nozzle motor. Assuming that the target rotational speed of the pump motor is 35 r/s, the target rotational speed n of the pump motor is in the second rotational speed range, and the target rotational speed n' of the nozzle motor is the target rotational speed of the nozzle motor corresponding to the second rotational speed range.

The nozzle motor drive module 3 is configured to drive the nozzle motor 30 to rotate at the target rotational speed n' of the nozzle motor so that the nozzle motor 30 controls the nozzle corresponding to the nozzle motor 30 to spray.

Since the micro-controller 1 can determine the target rotational speed n' of the nozzle motor according to the rotational speed range in which the target rotational speed n of the pump motor is located after the target rotational speed n of the pump motor is obtained, the target rotational speed n of the pump motor is correlated with the target rotational speed n' of the nozzle motor, so that the target rotational speed n' of the nozzle motor can change when the rotational speed range in which the target rotational speed n of the pump motor is located is changed, so that the nozzle motor 30 can drive the nozzle to rotate at an appropriate speed when the nozzle motor rotates according to the target rotational speed n' of the nozzle motor, thereby improving the atomization effect.

Figure 3:
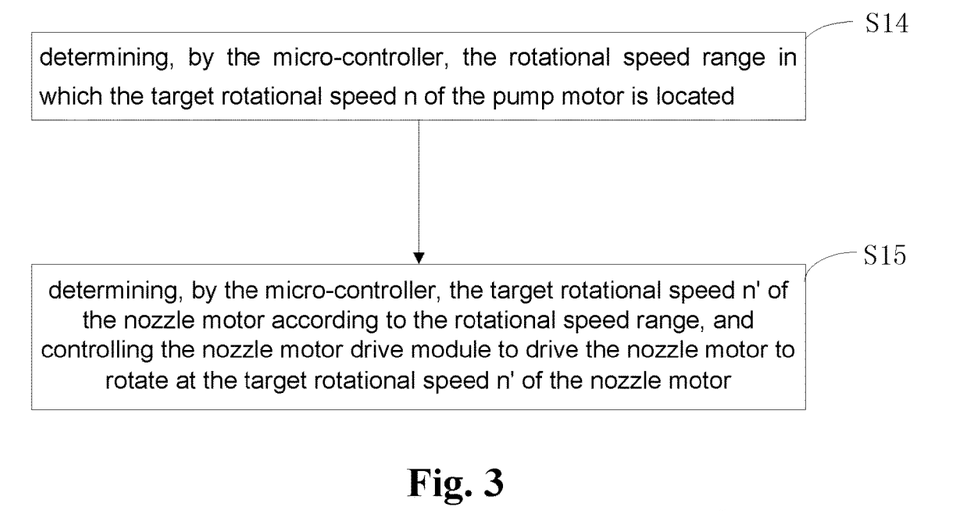
FIG. 3 is a flow diagram of the adjustment of the rotational speed of the nozzle of the aircraft spraying control device provided according to an embodiment of the disclosure.

Referring to FIG. 3, when the aircraft spraying control device provided by the above embodiments is implemented, after S3, the device further includes:

S14: determining, by the micro-controller 1, the rotational speed range in which the target rotational speed n of the pump motor is located;

S15: determining, by the micro-controller 1, the target rotational speed n' of the nozzle motor according to the rotational speed range, and controlling the nozzle motor drive module to drive the nozzle motor to rotate at the target rotational speed n' of the nozzle motor.

In the above embodiments, there are many unstable factors such as instable voltage in the rotation of the nozzle motor 30 so that the rotational speed of the nozzle motor 30 is liable to fluctuate. Therefore, although the micro-controller 1 transmits the target rotational speed n' of the nozzle motor to the nozzle motor drive module 3 so that the nozzle motor drive module 3 drives the nozzle motor 30 to rotate at the target rotational speed n' of the nozzle motor 30, if an unstable factor affecting the rotational speed of the nozzle motor 30 occurs during the rotation of the nozzle motor 30, the rotational speed thereof may be disturbed.

Figure 4:
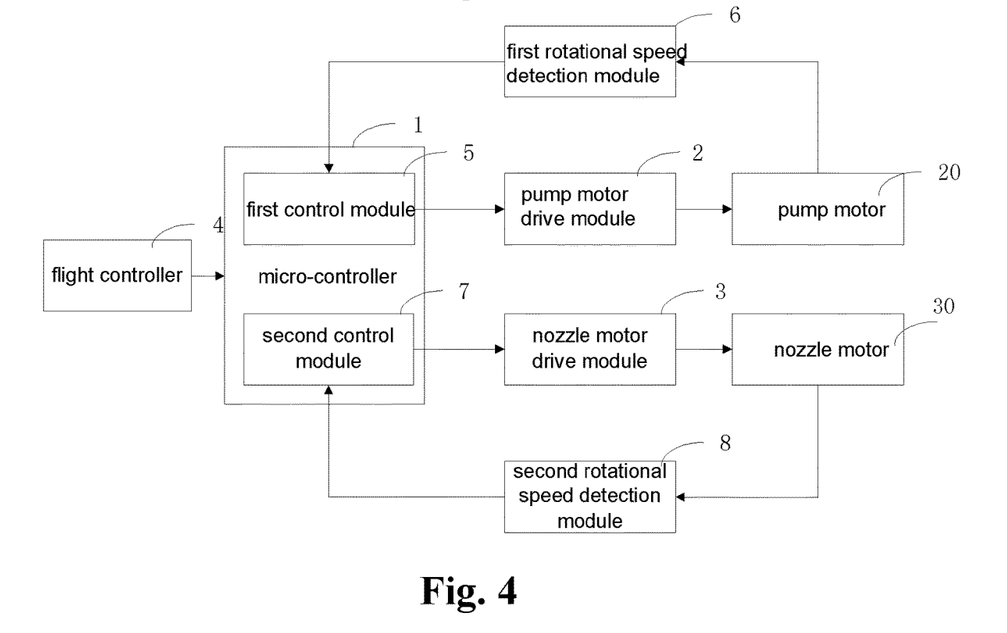
FIG. 4 is a structural block diagram of the aircraft spraying system provided according to an embodiment of the disclosure.

In order to keep the nozzle motor 30 rotating according to the target rotational speed n' of the nozzle motor, referring to FIGS. 1 and 4 at the same time, the aircraft spraying control device provided by the above embodiments further includes a second rotational speed detection module 8, wherein the micro-controller 1 further includes a second control module 7; the input of the second rotational speed detection module 8 is connected with the nozzle motor 30 and the output thereof is connected with the input of the second control module 7; the output of the second control module 7 is connected with the input of the nozzle motor drive module 3.

The second control module 7 is configured to control the nozzle motor drive module 3 to drive the nozzle motor 30 to rotate at the target rotational speed n' of the nozzle motor according to the target rotational speed n' of the nozzle motor and the rotational speed information of the nozzle motor collected by the second rotational speed detection module 8.

In an embodiment, the rotational speed information of the nozzle motor includes a current rotational speed $n'_i$ of the nozzle motor and a rotational speed $n'_{i-1}$ of the nozzle motor at a previous time;

the second control module 7 is configured to acquire a duty ratio of a second control pulse according to the target rotational speed n' of the nozzle motor, the current rotational speed $n'_i$ of the nozzle motor, and the rotational speed $n'_{i-1}$ of the nozzle motor at a previous time, and transmit the second control pulse to the nozzle motor drive module 3 according to the duty ratio of the second control pulse to control the nozzle motor drive module 3 to drive the nozzle motor 30 according to the second control pulse to rotate at the target rotational speed n' of the nozzle motor; wherein the duty ratio of the second control pulse is $=(n'-n'_i)K'_p+(n'-n'_i)K'_i+[(n-n'_i)-(n'_i-n'_{i-1})]K'_d$, wherein $K'_p$ is the rotational speed ratio coefficient of the nozzle motor;

$K'_i$ is the rotational speed integral coefficient of the nozzle motor; and $K'_d$ is the rotational speed differential coefficient of the nozzle motor.

It is possible to find that the second rotational speed detection module 8 can collect the rotational speed information of the nozzle motor in real time and transmit the rotational speed information to the second control module 7 with an example of controlling the nozzle motor drive module 3 by the second control module 7 to drive the nozzle motor 30 to rotate at the target rotational speed n' of the nozzle motor. The second control module 7, the second rotational speed detection module 8, the nozzle motor drive module 3, and the nozzle motor 30 form a closed loop, such that with such closed loop, the second control module 7 can take the received rotational speed information of the nozzle motor and the target rotational speed n' of the nozzle motor as parameters on the basis of monitoring the rotational speed information of the nozzle motor in real time, and acquire the duty ratio of the second control pulse using the duty ratio of the second control pulse=$(n'-n'_i)K'_p+(n'-n'_i)K'_i+[(n'-n'_i)-(n'_i-n'_{i-1})]K'_d$, so that the nozzle motor drive module 3 drives the nozzle motor 30 according to the second control pulse corresponding to the duty ratio of the second control pulse to rotate at the target rotational speed n' of the nozzle motor. It can be seen that the embodiment ensures the uniformity of the atomization effect by controlling the nozzle motor 30 to rotate at the target rotational speed n' of the nozzle motor by the closed loop, thereby achieving the object of uniform spraying. Moreover, even if some unstable factors affecting the rotational speed of the nozzle motor 30 occur during the rotation of the nozzle motor 30, the nozzle motor drive module 3 can be controlled by the second control module 7 and the second rotational speed detection module 8 to drive the nozzle motor 30 to rotate at the target rotational speed n' of the nozzle motor, and the actual rotational speed of the nozzle motor 30 is adjusted to the target rotational speed n' of the nozzle motor outputted from the micro-controller 1.

It should be noted that the example that the second control module 7 controls the nozzle motor drive module 3 to drive the nozzle motor 30 to rotate at the target rotational speed n' of the nozzle motor is merely an example, but is not limited to this example.

Referring to FIG. 4, the embodiments of the disclosure further provides an aircraft spraying system, including the aircraft spraying control device provided by the above technical solution, and further including a flight controller configured to transmit the flight information of the aircraft and the preset pesticide spraying information of the aircraft to the micro-controller.

As will be appreciated by those skilled in the art, the aircraft spraying system further includes a reservoir, a pump, and a nozzle, and the reservoir, the pump and the nozzle are connected in sequence by a pipe. The reservoir is configured to store pesticide, the pump includes a pump motor configured to supply the pump with power so that the pump can pump pesticide in the reservoir to the nozzle, and the nozzle is configured to spray pesticide to the object to be sprayed.

The pump and the nozzle are controlled by the aircraft spraying control device provided by the above embodiments.

The spraying system provided by the embodiments of the disclosure has the same beneficial effects as the aircraft spraying control device provided by the above technical solution, and is not described here.

The embodiment of the present disclosure also provides an agricultural plant protection aircraft, the agricultural plant protection aircraft includes: the spraying system, also comprises a rotor, a motor or an engine provided to drive the rotor to rotate, and a body configured to carry and mount the aircraft spraying system.

Figure 5:
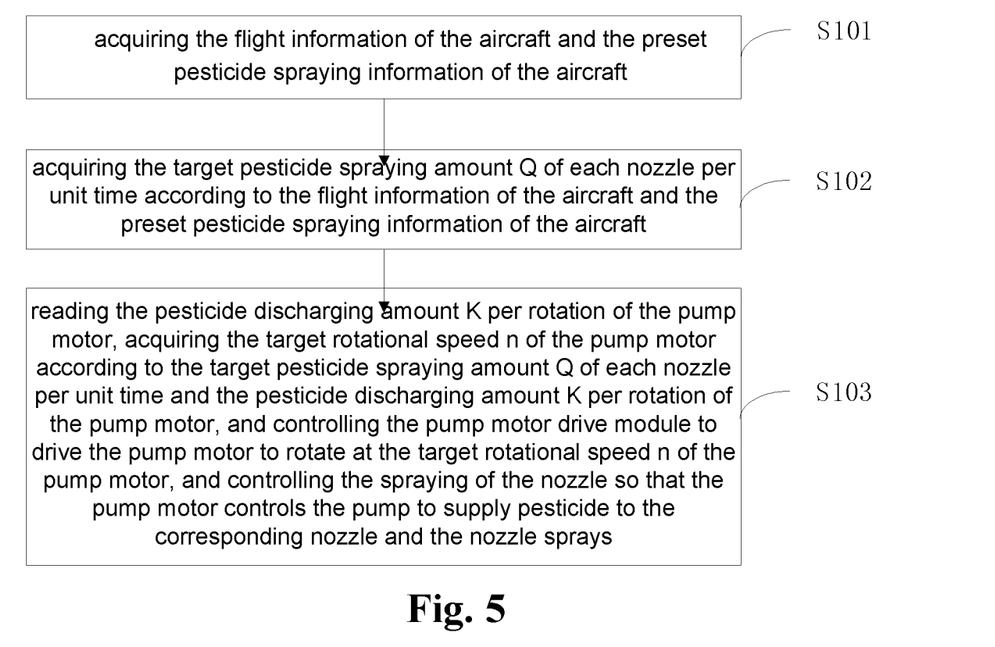
FIG. 5 is a first flow diagram of an aircraft spraying control method provided according to an embodiment of the disclosure.

Referring to FIG. 5, the embodiments of the disclosure further provides an aircraft spraying control method applied to the aircraft spraying control device provided by the above embodiments, including:

S101: acquiring the flight information of the aircraft and the preset pesticide spraying information of the aircraft;

S102: acquiring the target pesticide spraying amount Q of each nozzle per unit time according to the flight information of the aircraft and the preset pesticide spraying information of the aircraft; and S103: reading the pesticide discharging amount K per rotation of the pump motor, acquiring the target rotational speed n of the pump motor according to the target pesticide spraying amount Q of each nozzle per unit time and the pesticide discharging amount K per rotation of the pump motor, and controlling the pump motor drive module to drive the pump motor to rotate at the target rotational speed n of the pump motor, and controlling the spraying of the nozzle so that the pump motor controls the pump to supply pesticide to the corresponding nozzle and the nozzle sprays.

The aircraft spraying control method provided by the embodiments of the disclosure has the same beneficial effects as the aircraft spraying control device provided by the above technical solution, and is not described here.

Figure 6:
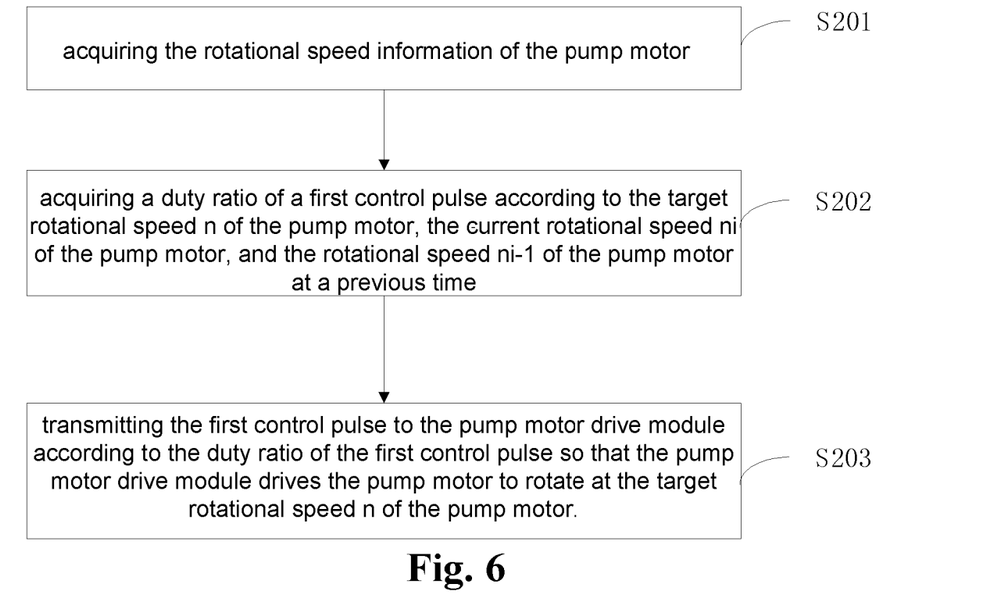
FIG. 6 is a second flow diagram of an aircraft spraying control method provided according to an embodiment of the disclosure.

In the above embodiments, there are various methods for controlling the pump motor drive module to drive the pump motor to rotate at the target rotational speed n of the pump motor in S103, and these methods will be described below with reference to FIG. 6. Optionally, S201-S203 may be included:

S201: acquiring the rotational speed information of the pump motor, wherein the rotational speed information of the pump motor includes a current rotational speed $n_i$ of the pump motor and a rotational speed $n_{i-1}$ of the pump motor at a previous time;

S202: acquiring a duty ratio of a first control pulse according to the target rotational speed n of the pump motor, the current rotational speed $n_i$ of the pump motor, and the rotational speed $n_{i-1}$ of the pump motor at a previous time, wherein the duty ratio of the first control pulse is $=(n-n_i)K_p+(n-n_i)K_i+[(n-n_i)-(n_i-n_{i-1})]K_d$, wherein $K_p$ is the rotational speed ratio coefficient of the pump motor, $K_i$ is the rotational speed integral coefficient of the pump motor, and $K_d$ is the rotational speed differential coefficient of the pump motor; and S203: transmitting the first control pulse to the pump motor drive module according to the duty ratio of the first control pulse so that the pump motor drive module drives the pump motor to rotate at the target rotational speed n of the pump motor.

The aircraft spraying control method provided by the embodiments of the disclosure has the same beneficial effects as the aircraft spraying control device provided by the above technical solution, and is not described here.

Figure 7:
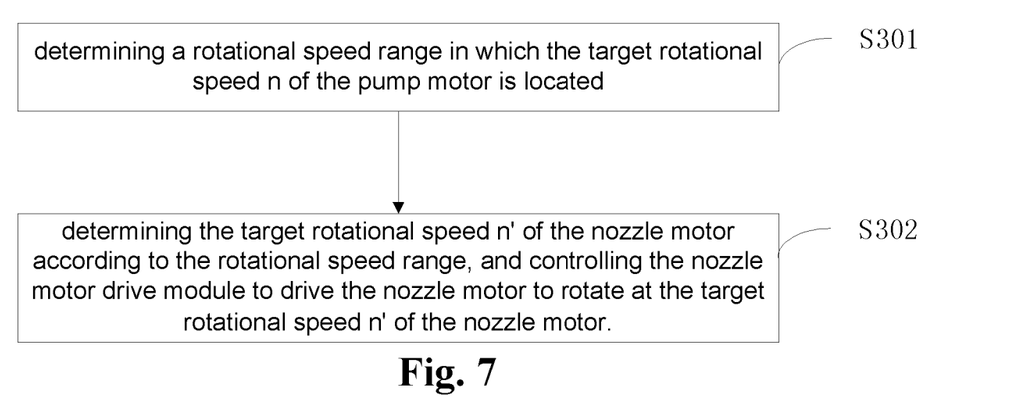
FIG. 7 is a third flow diagram of an aircraft spraying control method provided according to an embodiment of the disclosure.

Referring to FIG. 7, according to the aircraft spraying control method provided by the above embodiments, controlling the nozzle to spray in Step S103 can include S301-S302:

S301: determining a rotational speed range in which the target rotational speed n of the pump motor is located; and S302: determining the target rotational speed n' of the nozzle motor according to the rotational speed range, and controlling the nozzle motor drive module to drive the nozzle motor to rotate at the target rotational speed n' of the nozzle motor.

The aircraft spraying control method provided by the embodiments of the disclosure has the same beneficial effects as the aircraft spraying control device provided by the above technical solution, and is not described here.

Figure 8:
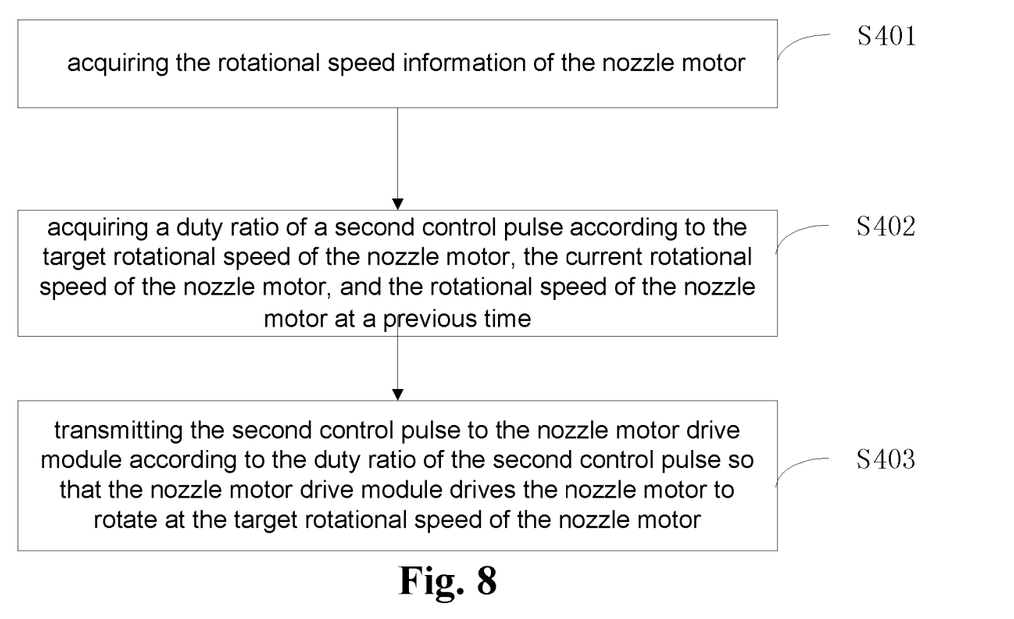
FIG. 8 is a fourth flow diagram of an aircraft spraying control method provided according to an embodiment of the disclosure.

There are various methods for controlling the nozzle motor drive module to drive the nozzle motor to rotate at the target rotational speed n' of the nozzle motor in S302, and these methods will be described below with reference to FIG. 8. Optionally, S401-S403 may be included.

S401: acquiring the rotational speed information of the nozzle motor, wherein the rotational speed information of the nozzle motor includes a current rotational speed $n'_i$ of the nozzle motor and a rotational speed $n'_{i-1}$ of the nozzle motor at a previous time;

S402: acquiring a duty ratio of a second control pulse according to the target rotational speed n' of the nozzle motor, the current rotational speed $n'_i$ of the nozzle motor, and the rotational speed $n'_{i-1}$ of the nozzle motor at a previous time, wherein the duty ratio of the second control pulse is $=(n'-n'_i)K'_p+(n'-n'_i)K'_i+[(n'-n'_i)-(n'_i-n'_{i-1})]K'_d$, wherein $K'_p$ is the rotational speed ratio coefficient of the nozzle motor, $K'_i$ is the rotational speed integral coefficient of the nozzle motor, and $K'_d$ is the rotational speed differential coefficient of the nozzle motor; and S403: transmitting the second control pulse to the nozzle motor drive module according to the duty ratio of the second control pulse so that the nozzle motor drive module drives the nozzle motor to rotate at the target rotational speed n' of the nozzle motor.

The aircraft spraying control method provided by the embodiments of the disclosure has the same beneficial effects as the aircraft spraying control device provided by the above technical solution, and is not described here.

Figure 9:
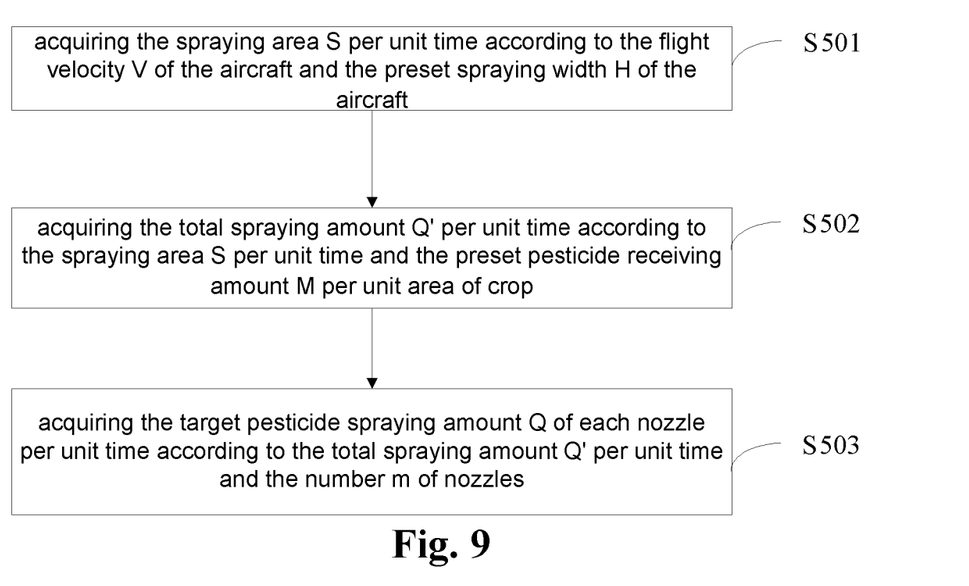
FIG. 9 is a fifth flow diagram of an aircraft spraying control method provided according to an embodiment of the disclosure.

Referring to FIG. 9, in an embodiment, the flight information of the aircraft includes a flight velocity V of the aircraft, and the preset pesticide spraying information includes the preset pesticide receiving amount M per unit area of crop and the preset spraying width H of the aircraft;

The above S102 includes S501-503:

S501: acquiring the spraying area S per unit time according to the flight velocity V of the aircraft and the preset spraying width H of the aircraft in which S=VH;

S502: acquiring the total spraying amount Q' per unit time according to the spraying area S per unit time and the preset pesticide receiving amount M per unit area of crop in which Q'=MS=VHM; and S503: acquiring the target pesticide spraying amount Q of each nozzle per unit time according to the total spraying amount Q' per unit time and the number m of nozzles in which $$Q = \frac{VMH}{m}.$$

The aircraft spraying control method provided by the embodiments of the disclosure has the same beneficial effects as the aircraft spraying control device provided by the above technical solution, and is not described here.

In the description of the above embodiments, a particular feature, structure, material, or characteristic may be combined in any one or more embodiments or examples in a suitable manner.

It should be appreciated by those of ordinary skill in the art that the units, the algorithms and the steps involved in the embodiments of the present invention can be realized by hardware, software or the combination thereof. Whether to realize these functions by hardware or software depends upon the specific application of a technical solution and restrictions in design. The realization of the same functions by those skilled in the art using other methods should fall within the scope of protection of the present invention.

It should be appreciated by those of ordinary skill in the art that the separate members involved in the embodiments of the present invention may be physically separated or not, or located at the same place or distributed in a plurality of network units. Moreover, the functional units involved in the embodiments of the present invention may be integrated in a processing unit or exist physically separately, or two or more of these functions are integrated in one unit.

These functions, when implemented as software units and sold or used as independent products, can be stored in a computer-readable storage medium. Based on the appreciation, the technical solutions of the present invention can be implemented as software products which can be stored in a storage medium and which include a plurality of instructions to execute a part of or all the steps of the methods described herein on one computer device (e.g. personal computer, server, or network device). The storage medium may be a U disk, a mobile hard disk drive, an ROM, an RAM, a diskette, a compact disc or another medium capable of storing program codes.

While certain embodiments have been described, these embodiments are not intended to limit the scope of the present invention. Indeed, any transformation or substitution that can be devised by those of ordinary skill in related arts without departing from the spirit of the inventions and without making creative efforts should fall within the scope of protection of the present invention which is defined by the appended claims.

What is claimed is:

1. An aircraft spraying control device, comprising:
   a micro-controller and a pump motor drive module;
   wherein the micro-controller is configured to acquire a flight information of the aircraft and a preset pesticide spraying information of the aircraft, and acquire a target pesticide spraying amount Q of each nozzle per unit time; and the micro-controller is configured to read a pesticide discharging amount K per rotation of the pump motor, acquire a target rotational speed n of the pump motor according to the target pesticide spraying amount Q of each nozzle per unit time and the pesticide discharging amount K per rotation of the pump motor, and control the pump motor drive module to drive the pump motor to rotate at the target rotational speed n of the pump motor; and the micro-controller is configured to control the nozzle to spray; and
   the pump motor drive module is configured to drive the pump motor to rotate at the target rotational speed n of the pump motor so that the pump motor controls the pump to supply pesticide to the corresponding nozzle;
   a nozzle motor drive module;
   wherein the micro-controller is further configured to determine a rotational speed range in which the target rotational speed n of the pump motor is located, determine a target rotational speed n' of the nozzle motor according to the rotational speed range, and control the nozzle motor drive module to drive the nozzle motor to rotate at the target rotational speed n' of the nozzle motor;
   the nozzle motor drive module is configured to drive the nozzle motor to rotate at the target rotational speed n' of the nozzle motor so that the nozzle motor controls the nozzle corresponding to the nozzle motor to spray; and a first rotational speed detection module, wherein the micro-controller comprises a first control module;

an input of the first rotational speed detection module is connected with the pump motor and an output thereof is connected with the input of the first control module;

the output of the first control module is connected with the input of the pump motor drive module; and the first control module is configured to control the pump motor drive module to drive the pump motor to rotate at the target rotational speed n of the pump motor according to the target rotational speed n of the pump motor and the rotational speed information of the pump motor collected by the first rotational speed detection module.

2. The aircraft spraying control device according to claim 1, wherein the rotational speed information of the pump motor comprises a current rotational speed $n_i$ of the pump motor and a rotational speed n of the pump motor at a previous time;

the first control module is configured to acquire a duty ratio cycle of a first control pulse according to the target rotational speed n of the pump motor, the current rotational speed $n_i$ of the pump motor, and the rotational speed $n_{i-1}$ of the pump motor at the previous time, and transmit the first control pulse to the pump motor drive module according to the duty ratio of the first control pulse to control the pump motor drive module to drive the pump motor according to the first control pulse to rotate at the target rotational speed n of the pump motor; wherein the duty ratio of the first control pulse is $=(n-n_i)K_p+(n-n_i)K_i+[(n-n_i)-(n_i-n_{i-1})]K_d$, wherein $K_p$ is a rotational speed ratio coefficient of the pump motor, $K_i$ is a rotational speed integral coefficient of the pump motor, and $K_d$ is a rotational speed differential coefficient of the pump motor.

3. The aircraft spraying control device according to claim 1, further comprising a second rotational speed detection module, the micro-controller further comprises a second control module;

an input of the second rotational speed detection module is connected with the nozzle motor and an output thereof is connected with the input of the second control module;

the output of the second control module is connected with the input of the nozzle motor drive module; and the second control module is configured to control the nozzle motor drive module to drive the nozzle motor to rotate at the target rotational speed n' of the nozzle motor according to the target rotational speed n' of the nozzle motor and the rotational speed information of the nozzle motor collected by the second rotational speed detection module.

4. The aircraft spraying control device according to claim 3, wherein the rotational speed information of the nozzle motor comprises a current rotational speed $n'_i$ of the nozzle motor and a rotational speed $n'_{i-1}$ of the nozzle motor at a previous time;

the second control module is configured to acquire a duty ratio of a second control pulse according to the target rotational speed n' of the nozzle motor, the current rotational speed $n'_i$ of the nozzle motor, and the rotational speed $n'_{i-1}$ of the nozzle motor at the previous time, and transmit the second control pulse to the nozzle motor drive module according to the duty ratio of the second control pulse to control the nozzle motor drive module to drive the nozzle motor according to the second control pulse to rotate at the target rotational speed n' of the nozzle motor; wherein the duty ratio of the second control pulse is $=(n'-n'_i)K'_p+(n'-n'_i)K'_i+[(n-n'_i)-(n'_i-n'_{i-1})]K'_d$, wherein $K'_p$ is a rotational speed ratio coefficient of the nozzle motor, $K'_i$ is a rotational speed integral coefficient of the nozzle motor, and $K'_d$ is a rotational speed differential coefficient of the nozzle motor.

5. The aircraft spraying control device according to claim 1, wherein the flight information of the aircraft comprises a flight velocity V of the aircraft, and the preset pesticide spraying information comprises a preset pesticide receiving amount M per unit area of crop and a preset spraying width H of the aircraft;

the micro-controller calculates the acquired target pesticide spraying amount Q of each nozzle per unit time using the flight information according to a preset algorithm.

6. The aircraft spraying control device according to claim 1, wherein the target rotational speed of the pump motor is $$n = \frac{Q}{K}.$$

7. An aircraft spraying system, comprising the aircraft spraying control device according to claim 1, and further comprising:

a flight controller configured to transmit the flight information of the aircraft and the preset pesticide spraying information of the aircraft to the micro-controller.

8. An aircraft spraying control method, comprising steps of:

acquiring a flight information of the aircraft and a preset pesticide spraying information of the aircraft;

acquiring a target pesticide spraying amount Q of each nozzle per unit time according to the flight information of the aircraft and the preset pesticide spraying information of the aircraft; and reading a pesticide discharging amount K per rotation of the pump motor, acquiring a target rotational speed n of the pump motor according to the target pesticide spraying amount Q of each nozzle per unit time and the pesticide discharging amount K per rotation of the pump motor, and controlling the pump motor drive module to drive the pump motor to rotate at the target rotational speed n of the pump motor, and controlling the spraying of the nozzle so that the pump motor controls the pump to supply pesticide to the corresponding nozzle and the nozzle sprays;

wherein controlling the nozzle to spray comprises:

determining a rotational speed range in which the target rotational speed n of the pump motor is located; and determining a target rotational speed n' of the nozzle motor according to the rotational speed range, and controlling the nozzle motor drive module to drive the nozzle motor to rotate at the target rotational speed n' of the nozzle motor;

wherein the steps for the aircraft spraying control method is performed by an aircraft control device that comprises;

a first rotational speed detection module, the micro-controller comprises a first control module;

an input of the first rotational speed detection module is connected with the pump motor and an output thereof is connected with the input of the first control module;

the output of the first control module is connected with the input of the pump motor drive module; and the first control module is configured to control the pump motor drive module to drive the pump motor to rotate at the target rotational speed n of the pump motor according to the target rotational speed n of the pump motor and the rotational speed information of the pump motor collected by the first rotational speed detection module.

9. The aircraft spraying control method according to claim 8, wherein controlling the pump motor drive module to drive the pump motor to rotate at the target rotational speed n of the pump motor comprises:

acquiring the rotational speed information of the pump motor, wherein the rotational speed information of the pump motor comprises a current rotational speed $n_i$ of the pump motor and a rotational speed $n_{i-1}$ of the pump motor at a previous time;

acquiring a duty ratio of a first control pulse according to the target rotational speed n of the pump motor, the current rotational speed $n_i$ of the pump motor, and the rotational speed $n_{i-1}$ of the pump motor at the previous time, wherein the duty ratio of the first control pulse is $=(n-n_i)K_p+(n-n_i)K_i+[(n-n_i)-(n_i-n_{i-1})]K_d$, wherein $K_p$ is a rotational speed ratio coefficient of the pump motor, $K_i$ is a rotational speed integral coefficient of the pump motor, and $K_d$ is a rotational speed differential coefficient of the pump motor; and transmitting the first control pulse to the pump motor drive module according to the duty ratio of the first control pulse so that the pump motor drive module drives the pump motor to rotate at the target rotational speed n of the pump motor.

10. The aircraft spraying control method according to claim 8, wherein controlling the nozzle motor drive module to drive the nozzle motor to rotate at the target rotational speed n' of the nozzle motor comprises:

acquiring the rotational speed information of the nozzle motor, wherein the rotational speed information of the nozzle motor comprises a current rotational speed $n'_i$ of the nozzle motor and a rotational speed $n'_{i-1}$ of the nozzle motor at a previous time;

acquiring a duty ratio of a second control pulse according to the target rotational speed n' of the nozzle motor, the current rotational speed $n'_i$ of the nozzle motor, and the rotational speed $n'_{i-1}$ of the nozzle motor the previous time, wherein the duty ratio of the second control pulse is $=(n'-n'_i)K'_p+(n'-n'_i)K'_i+[(n-n'_i)-(n'_i-n'_{i-1})]K'_d$, wherein $K'_p$ is a rotational speed ratio coefficient of the nozzle motor, $K'_i$ is a rotational speed integral coefficient of the nozzle motor, and $K'_d$ is a rotational speed differential coefficient of the nozzle motor; and transmitting the second control pulse to the nozzle motor drive module according to the duty ratio of the second control pulse so that the nozzle motor drive module drives the nozzle motor to rotate at the target rotational speed n' of the nozzle motor.

11. The aircraft spraying control method according to claim 8, wherein the flight information of the aircraft comprises a flight velocity V of the aircraft, and the preset pesticide spraying information comprises a preset pesticide receiving amount M per unit area of crop and a preset spraying width H of the aircraft;

acquiring the target pesticide spraying amount Q of each nozzle per unit time according to the flight information of the aircraft and the preset pesticide spraying information of the aircraft comprises:

acquiring a spraying area S per unit time according to the flight velocity V of the aircraft and the preset spraying width H of the aircraft;

acquiring a total spraying amount Q' per unit time according to the spraying area S per unit time and the preset pesticide receiving amount M per unit area of crop; and acquiring the target pesticide spraying amount Q of each nozzle per unit time according to the total spraying amount Q' per unit time and a number m of nozzles.

* * * * *